(12) United States Patent
Vittatoe

(10) Patent No.: US 10,549,634 B1
(45) Date of Patent: Feb. 4, 2020

(54) POWER-TAKE-OFF (PTO) ELECTRICAL GENERATOR SYSTEM FOR MECHANICALLY DRIVING AN AIR COMPRESSOR AND ASSOCIATED USE THEREFORE

(71) Applicant: Terry Vittatoe, Orange Park, FL (US)

(72) Inventor: Terry Vittatoe, Orange Park, FL (US)

(*) Notice: Subject to any disclaimer, the term of this patent is extended or adjusted under 35 U.S.C. 154(b) by 0 days.

(21) Appl. No.: 16/519,479

(22) Filed: Jul. 23, 2019

Related U.S. Application Data

(60) Provisional application No. 62/742,598, filed on Oct. 8, 2018.

(51) Int. Cl.
B60K 25/00 (2006.01)
B60K 25/06 (2006.01)
F04C 29/04 (2006.01)
F04C 29/00 (2006.01)

(52) U.S. Cl.
CPC .......... B60K 25/06 (2013.01); F04C 29/0042 (2013.01); F04C 29/04 (2013.01)

(58) Field of Classification Search
CPC .......... B60K 25/02; B60K 25/06; F02B 67/06
USPC ........................................ 180/53.7; 192/58.3
See application file for complete search history.

(56) References Cited

U.S. PATENT DOCUMENTS

| | | | | |
|---|---|---|---|---|
| 4,136,751 A | * | 1/1979 | Poore | B60K 25/06 180/53.8 |
| 2004/0177837 A1 | * | 9/2004 | Bryant | F02B 29/0412 123/559.1 |
| 2007/0016355 A1 | * | 1/2007 | Kamado | E02F 9/2246 701/103 |
| 2009/0301429 A1 | * | 12/2009 | Takashina | F02B 67/06 123/197.5 |
| 2010/0192574 A1 | * | 8/2010 | Langson | F01K 15/00 60/670 |
| 2011/0011073 A1 | * | 1/2011 | Bradley | F16D 33/04 60/329 |
| 2012/0055719 A1 | * | 3/2012 | Potter | B60K 25/02 180/53.7 |
| 2012/0207620 A1 | * | 8/2012 | Dalum | B60K 6/12 417/44.1 |
| 2012/0258838 A1 | * | 10/2012 | Hartz | B60K 6/40 477/5 |
| 2012/0258839 A1 | * | 10/2012 | Smithson | B60H 1/3222 477/42 |
| 2019/0292975 A1 | * | 9/2019 | Hou | F01P 7/044 |

* cited by examiner

Primary Examiner — Toan C To
(74) Attorney, Agent, or Firm — Ashkan Najafi

(57) ABSTRACT

A power-take-off (PTO) electrical generator system for mechanically driving a rotary screw type air compressor employed in a space-confined environment of a utility truck, includes: a controller mounted to a portion of an existing utility truck, a PTO operably coupled to an existing engine of the existing utility truck as well as the controller, an electrical generator located at the existing utility truck and operably coupled directly to and driven by the PTO, an air compressor directly coupled to and mechanically driven directly by the electrical generator and located at a space-confined section of the existing utility truck, and a cooling fan assembly located at the existing utility truck and directly coupled to the air compressor. The electrical generator is intermediately positioned between the PTO and the air compressor.

16 Claims, 5 Drawing Sheets

POWER-TAKE-OFF (PTO) ELECTRICAL GENERATOR SYSTEM FOR MECHANICALLY DRIVING AN AIR COMPRESSOR AND ASSOCIATED USE THEREFORE

CROSS REFERENCE TO RELATED APPLICATIONS

This is a non-provisional patent application that claims the benefit of U.S. provisional patent application No. 62/742,598 filed Oct. 8, 2018, which is incorporated by reference herein in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to generator-driven air compressors and, more particularly, to a specially designed power-take-off (PTO) electrical generator system for mechanically driving a rotary screw type air compressor employed in a space-confined environment of a utility truck.

Prior Art

A power take-off or power takeoff (PTO) is any of several methods for taking power from a power source, such as a running engine, and transmitting it to an application such as an attached implement or separate machines. Most commonly, it is a splined first rectilinear input shaft installed on a tractor or truck allowing implements with mating fittings to be powered directly by the truck engine.

In general, portable generator sets comprising a generator and an engine, are well known. The generator typically comprises a rotor and stator arranged for relative rotation. Generally, the rotor is driven by the energy source, often mounted on the shaft of the engine. The rotor typically generates a magnetic field (using either permanent magnets or windings), which interacts with windings maintained on the stator. As the magnetic field intercepts the windings, an electrical current is generated. The induced current is typically applied to a bridge rectifier, sometimes regulated, and provided as an output. In some instances, the rectified signal is applied to an inverter to generate an AC output.

PTOs and generator sets may be employed by portable power conversion systems, which find particular utility as power sources for auxiliary equipment or implements typically mounted to trucks and tractors, for example.

In addition, portable compressor systems are also, in general, known. Such systems typically include: an engine; a compressor (typically a reciprocating piston pump); a drive system between the engine and the compressor; a transfer tube (conduit); a check valve; a storage reservoir (one or more tanks); a pressure regulator; and an output line terminating in an output valve. In general, the compressor intakes atmospheric air, and generates pressurized air, which is routed by the transfer conduit to the storage reservoir through the check valve. A reserve of pressurized air is thus developed in the storage reservoir. The regulator is typically disposed downstream of the storage reservoir, interposed between the reservoir and output line, with the intent that air is provided at the output valve at a predetermined regulated pressure.

U.S. Pat. No. 5,224,836 to Gunn et al. states that electronic controllers have been applied to control the angular velocity of internal combustion engine prime driver and compressor combinations which are coupled to also drive an electric generator, but that since the generator requires a substantially constant angular velocity for proper operation regardless of operating conditions, to maintain a constant frequency, the function of the controller for these internal combustion engine prime driver—centrifugal compressor—generator combinations is to produce a constant angular velocity under all conditions.

No known systems to date have employed a PTO to drive a generator that drives a rotary screw type air compressor. Accordingly, a need remains for a PTO electrical generator system that mechanically powers a rotary screw type air compressor in order to overcome at least one of the above-noted shortcomings. The exemplary embodiment(s) satisfy such a need by a PTO electrical generator system that is convenient and easy to use, durable in design, versatile in its applications, and designed to mechanically drive a variety of encapsulated air compressors in space-limited areas such as a side or rear of a utility truck.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a specially designed power-take-off (PTO) electrical generator system for mechanically driving a rotary screw type air compressor employed in a space-confined environment of a utility truck. These and other objects, features, and advantages of the non-limiting exemplary embodiment(s) are provided by a power-take-off (PTO) electrical generator system for mechanically driving a rotary screw type air compressor employed in a space-confined environment of a utility truck. Such a system includes a controller mounted to a portion of an existing utility truck, a PTO operably coupled to an existing engine of the existing utility truck as well as the controller, an electrical generator located at the existing utility truck and operably coupled directly to and driven by the PTO, an air compressor directly coupled to and mechanically driven directly by the electrical generator and located at a space-confined section of the existing utility truck, and a cooling fan assembly located at the existing utility truck and directly coupled to the air compressor. Advantageously, the electrical generator is intermediately positioned between the PTO and the air compressor. Such a structural configuration provides the new, useful, and unexpected results of: 1) putting the generator as a primary equipment versus the other equipment; 2) using higher kilowatts and lower CFM whereas conventional systems require higher CFM and lower limit kilowatts due to how the PTO drives the compressor; 3) targeting specific customer needs; and 4) using mechanical power through an on-board generator to drive auxiliary equipment.

In a non-limiting exemplary embodiment, the air compressor is an encapsulated rotary screw air compressor.

In a non-limiting exemplary embodiment, the electrical generator has a centrally registered longitudinal axis and includes: a first rectilinear input shaft aligned along the centrally registered longitudinal axis, and a first coupling directly mated to the first rectilinear input shaft.

In a non-limiting exemplary embodiment, the electrical generator further includes a U-joint directly connected to the first coupling.

In a non-limiting exemplary embodiment, the electrical generator further includes a rectilinear power-drive shaft directly connected to the PTO and the U-joint.

In a non-limiting exemplary embodiment, wherein the compressor includes an input drive shaft. The electrical generator further includes a second coupling directly coupled to the first rectilinear input shaft and the input drive shaft. Advantageously, the second coupling is configured to rotate in sync with the first rectilinear input shaft and the input drive shaft and said rectilinear power-drive shaft. Advantageously, the second coupling is coaxially aligned with the first rectilinear input shaft and the input drive shaft and said rectilinear power-drive shaft.

In a non-limiting exemplary embodiment, the cooling fan assembly includes: a compressor oil cooling input line coupled to the encapsulated rotary screw air compressor and the cooling fan assembly, and a compressor oil cooling output line coupled to the encapsulated rotary screw air compressor and the cooling fan assembly. Advantageously, the compressor oil cooling output line is located downstream from the compressor oil cooling input line.

In a non-limiting exemplary embodiment, the controller includes: a voltage gauge in electrical communication with the generator, a frequency gauge in electrical communication with the generator, and a PTO switch in electrical communication with the PTO.

The present disclosure further includes a method of utilizing a power-take-off (PTO) electrical generator system for mechanically driving a rotary screw type air compressor employed in a space-confined environment of a utility truck. Such a method includes the steps of: providing an existing utility truck; providing and mounting a controller to a portion of the existing utility truck; providing and operably coupling a PTO to an existing engine of the existing utility truck as well as the controller; providing and locating an electrical generator at the existing utility truck; operably coupling the electrical generator directly to the PTO such that the electrical generator is driven by the PTO; providing and locating an air compressor at a space-confined section of the existing utility truck; directly coupling the air compressor to the electrical generator; the electrical generator mechanically and directly driving the air compressor; providing and locating a cooling fan assembly at the existing utility truck; and directly coupling the cooling fan assembly to the air compressor. Advantageously, the electrical generator is intermediately positioned between the PTO and the air compressor.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Figure 1:
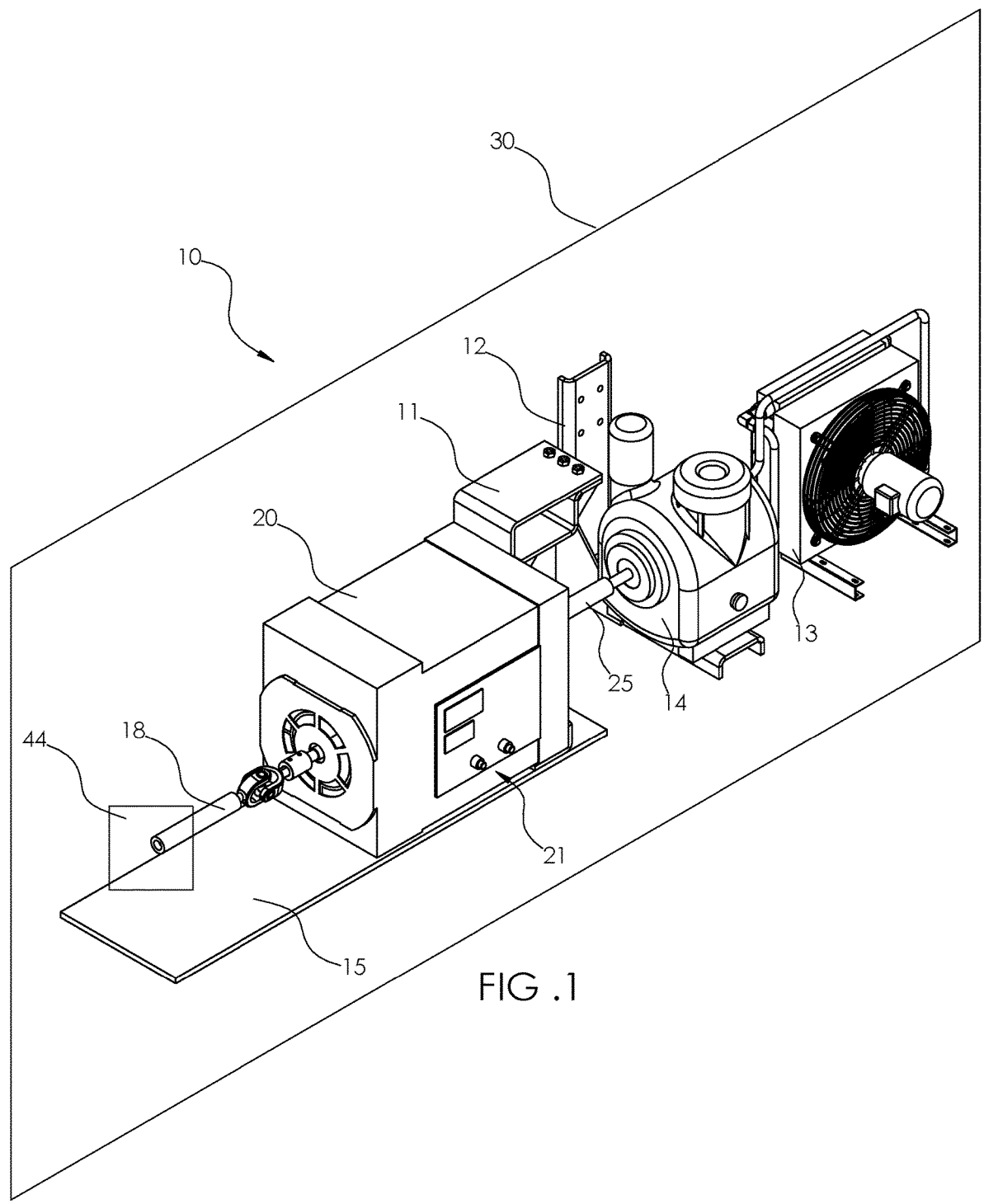
FIG. 1 is a perspective view of a specially designed power-take-off (PTO) electrical generator system for mechanically driving a rotary screw type air compressor employed in a space-confined environment of a utility truck, in accordance with a non-limiting exemplary embodiment of the present disclosure.
Figure 2:
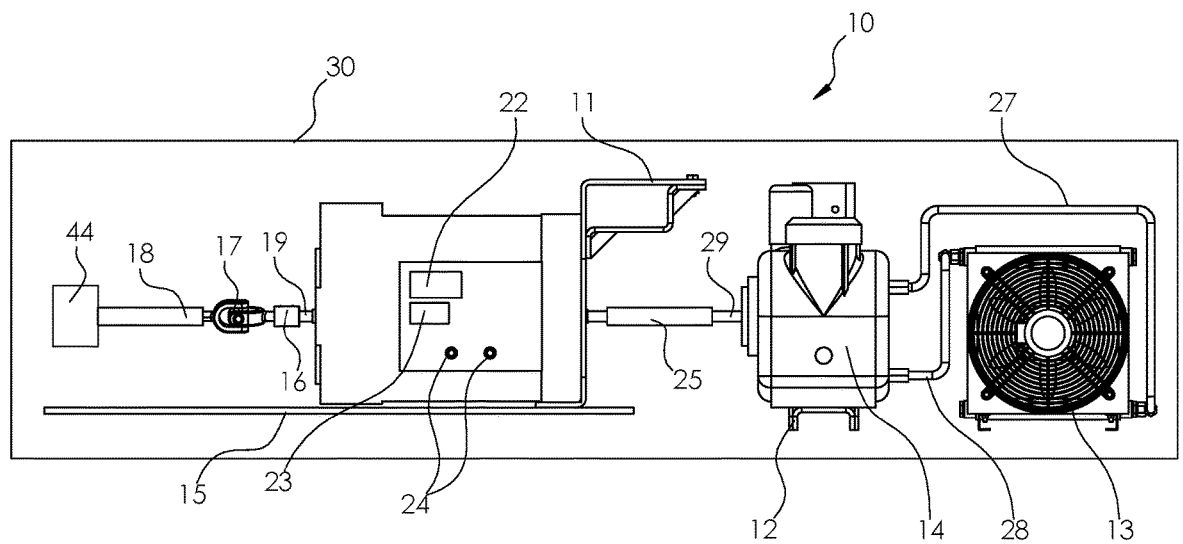
FIG. 2 is a side elevational view of the specially designed power-take-off (PTO) electrical generator system.
Figure 3:
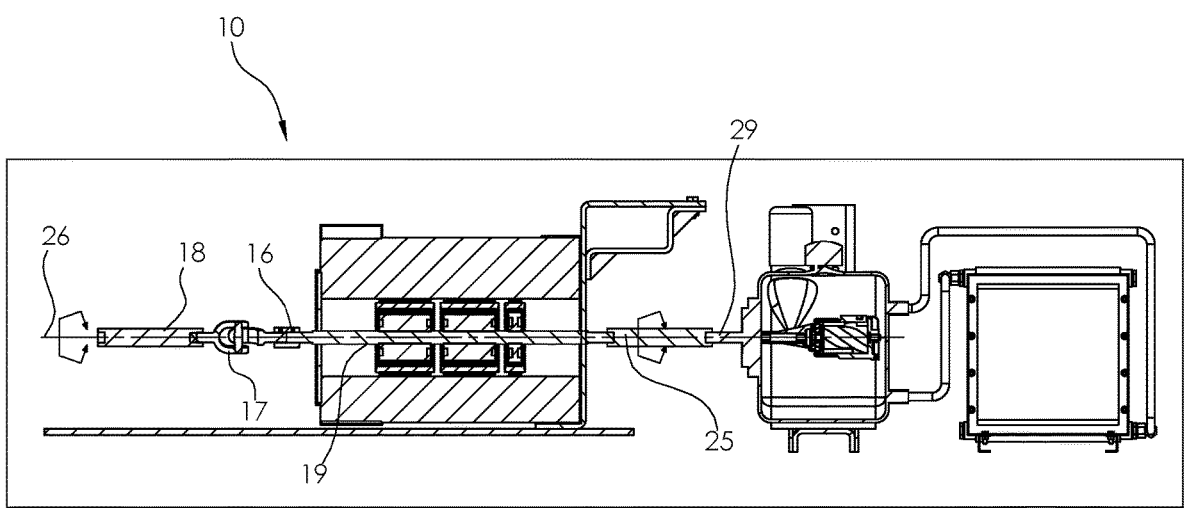
FIG. 3 is a cross-sectional view taken along a longitudinal length of the specially designed power-take-off (PTO) electrical generator system.
Figure 4:
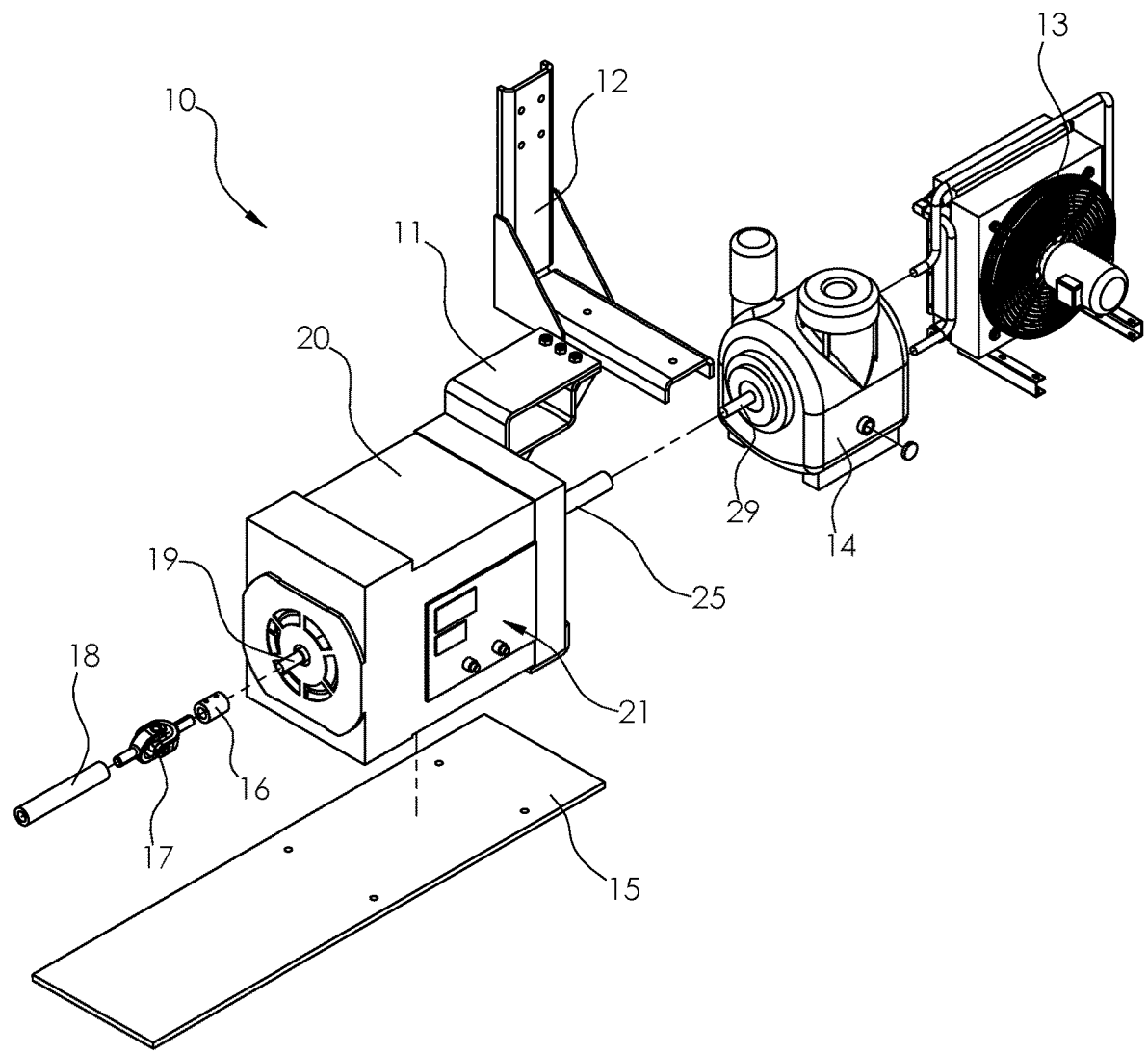
FIG. 4 is an exploded view of the specially designed power-take-off (PTO) electrical generator system.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about" means approximately or nearly and in the context of a numerical value or range set forth means±15% of the numerical.

If used herein, "substantially" means largely if not wholly that which is specified but so close that the difference is insignificant.

If used herein, "directly" means without the use of an intermediary element.

The non-limiting exemplary embodiment(s) is/are referred to generally in FIGS. 1-7 and is/are intended to provide a specially designed power-take-off (PTO 44) electrical generator system 10 for mechanically driving an encapsulated rotary screw type air compressor 14 employed in a space-confined environment of a utility truck 30. The PTO 44 is powered by the truck 30 transmission. It should be understood that the exemplary embodiment(s) may be used to power a variety of auxiliary equipment mounted to the utility truck 30, and should not be limited to any particular auxiliary equipment described herein. The truck 30 is shown at reference numeral 30 by a rectangular area because a variety of truck 30 shapes and sizes may be employed. The system 10 may be employed in space-limited environments such as onboard excavators, aerial/bucket/man lifts, dump trucks, fire/rescue trucks, sewer cleaning trucks, water pump trucks, etc. All such vehicles employ an engine assembly that powers the PTO 44.

In a non-limiting exemplary embodiment, the engine assembly may include an engine, a throttle, a transmission, and an ignition. The engine may be any conventional engine (e.g., an internal combustion gasoline engine) suitable for use as a prime mover supplying rotational power via an output shaft. The position of the throttle determines engine speed (e.g., the RPM of the output shaft).

In a non-limiting exemplary embodiment, the PTO 44 employed by the present disclosure may be a typical PTO 44 designed to pick up engine power, through rotation, and transfer it to another piece of equipment. The PTO 44 preferably operates in a conventional manner wherein it employs a gear, or gear set. Rotation is picked up by gears meshing or mating with other gears, and in order for the PTO 44 to work, the gears mesh with the truck 30 transmission's PTO 44 drive gear.

Advantageously, the power-take-off electrical generator system 10 mechanically drives an encapsulated rotary screw type air compressor 14 employed in a space-confined environment of a utility truck 30. Such a system 10 includes a PTO 44 operably coupled to an existing engine (transmission) of an existing utility truck 30, an electrical generator 20 operably coupled to and driven by the PTO 44, and a rotary screw type air compressor 14 coupled to and mechanically driven by the electrical generator 20 and located at a space-confined section of the existing utility truck 30. Advantageously, the generator 20 is intermediately positioned between the PTO 44 and the encapsulated air compressor 14. Advantageously, the electrical generator 20 mechanically drives the air compressor 14 (e.g., encapsulated air compressor). Such a structural configuration yields a new, useful, and unexpected result of requiring less space to store the electrical generator 20 and air compressor 14 at a side or rear of utility truck 30, which often has space-limited storage for auxiliary equipment power sources. System 10 also uses less power provided from the truck transmission to the PTO 44.

In a non-limiting exemplary embodiment, in FIGS. 1-4, the interface (e.g., drive coupling 25) between the electrical generator 20 output and the air compressor 14 input may be a direct coupling 25 such as a rotatable shaft.

Figure 5:
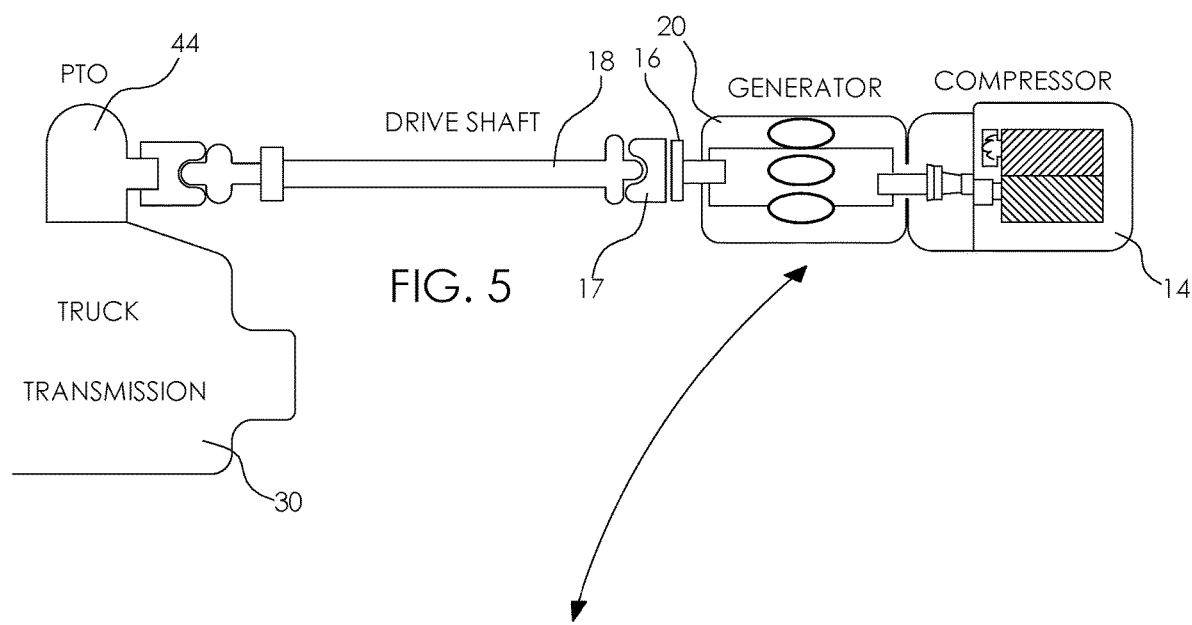
FIG. 5 is another side elevational view of the specially designed power-take-off (PTO) electrical generator system, in accordance with a non-limiting exemplary embodiment of the present disclosure.

In a non-limiting exemplary embodiment, in FIG. 5, the interface (e.g., drive coupling 25) between the electrical generator 20 output and the air compressor 14 input may be a small gear box depending on the generator 20 type (e.g., 2-pole or 4-pole).

Figure 6:
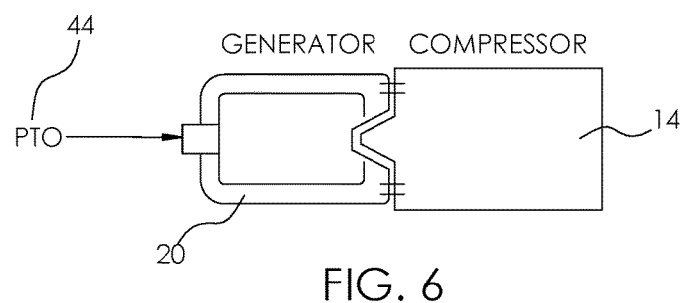
FIG. 6 is a side elevational view showing the operational interrelationship between the generator and compressor, in accordance with a non-limiting exemplary embodiment of the present disclosure.

In a non-limiting exemplary embodiment, in FIG. 6, the interface (e.g., drive coupling 25) between the electrical generator 20 output and the air compressor 14 input may be direct link including a beveled or tapered shaft interfitted within a corresponding socket.

In a non-limiting exemplary embodiment, there is a PTO switch 53 that activates a solenoid allowing hydraulic fluid from the truck 30 transmission to lock up the clutch inside the PTO 44. The PTO 44 then starts spinning drive shaft 18 (first rectilinear input shaft) and mechanically turns the generator 20 and compressor 14 simultaneously. After about two to five seconds, a signal is sent to the truck 30 engine requesting it to elevate engine speed to a target revolutions per minute (RPM). This target RPM will determine generator 20 RPM, frequency and voltage as well as compressor 14 CFM output. There are both temperature and pressure safeties to protect the system 10. The system 10 is also equipped with a voltage gauge 52 and a frequency gauge 51 and a light that indicates the system 10 is engaged via the PTO switch 53.

In a non-limiting exemplary embodiment, referring to FIGS. 1-7, a generator 20 rear support bracket 11 is made to squeeze against a cross-member used to support a rear of the generator 20. Generator 20 support bracket 15 mounts to a base of the generator 20. Support bracket 12 mounts to compressor 14 and secures it at a space-confined location at the truck 30. Cooling fan assembly 13 is provided to cool compressor 14 hydraulic fluid (e.g., oil). Encapsulated rotary screw air compressor 14 makes and supplies (outputs) compressed air for customers use of anything that requires compressed air such as pumping up tires, air tools, blowing out things, etc. Base generator 20 bracket 15 (plate) supports the base generator 20 thereon. First coupling 16 is located exterior of the generator 20 or front portion thereof and is operably connected to U-joint 17 that is locked to the rectilinear power-drive shaft 18 (drive shaft powered by the PTO 44) to drive the generator 20. The U-joint 17 is connected between the generator 20 first coupling 16 and rectilinear power-drive shaft 18 (drive shaft). The U-joint 17 between rectilinear power-drive shaft 18 is used to allow alignment of two components but still safely drive the generator 20. A first rectilinear input shaft 19 is connected to the generator 20 motor and supplies rotational power to turn the generator 20 and the compressor 14. A second coupling 25 receives mechanical power from the generator 20 and first rectilinear input shaft 19. Coupling 25 provides mechanical power to rotary screw compressor 14.

Advantageously, generator 20 provides both alternating electrical power (A/C volts, amps, watts) for customers to use electrical power and mechanical power out via second coupling 25, which drives a rotary screw compressor 14. Thus, the first rectilinear input shaft 19 in combination with the second coupling 25 provides mechanical power that directly operates rotary screw compressor 14. A compressor oil cooling input line 27 is coupled to the cooling fan assembly 13 and the compressor 14. Heated oil, to be cooled, is sent from the compressor 14 to the cooling fan assembly 13. A compressor oil cooling output line 28 is coupled to the cooling fan assembly 13 and sends cooled oil returning from the cooling fan assembly 13 back to the compressor 14. The compressor 14 has an input shaft 29, which is mechanically coupled to the encapsulated rotary screw compressor 14 for driving the encapsulated rotary screw compressor 14 via the second coupling 25. The power take-off 44 is operated by power from the truck 30 transmission. Such a power take-off 44 provides power for driving the generator 20. The power take-off 44 may include a gear box, as explained above.

Figure 7:
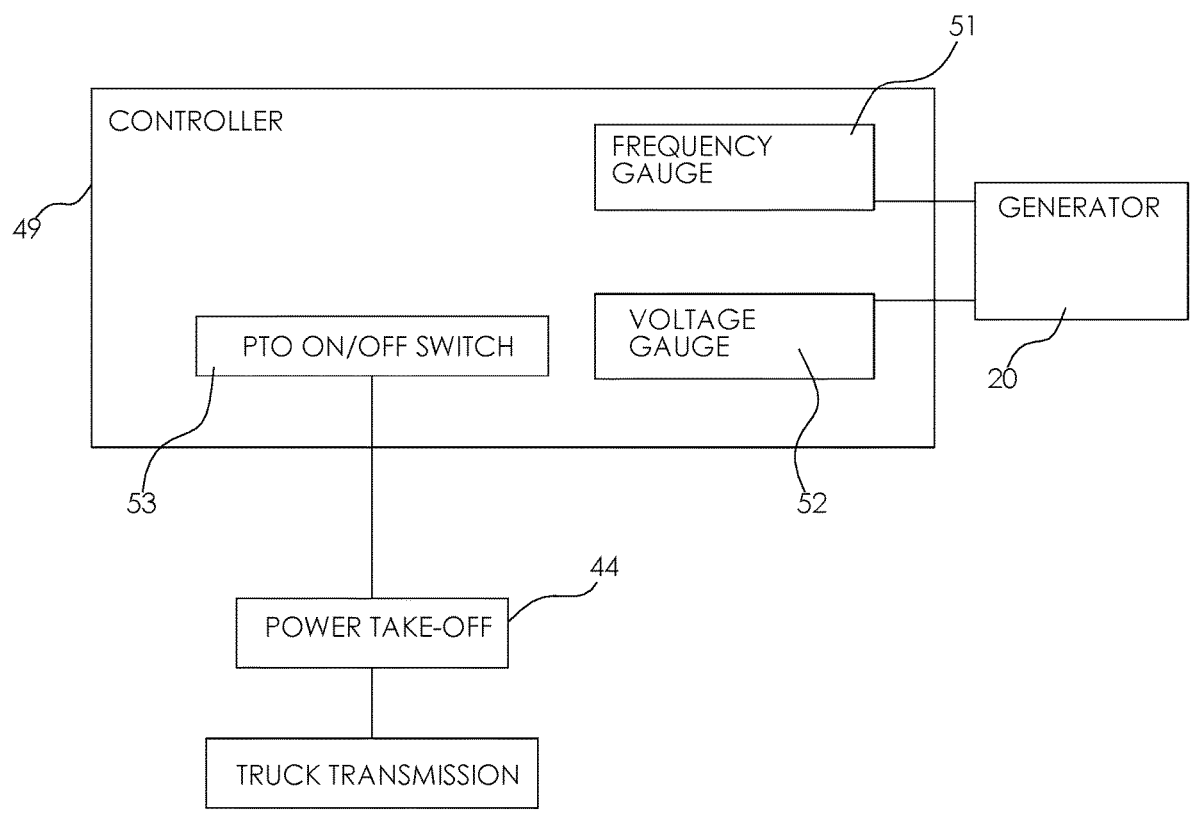
FIG. 7 is a high-level schematic block diagram showing the interrelationship between some of the major electrical components of the present disclosure.

Referring to FIG. 7, a controller 49 may be mounted inside the truck or other accessible location at the truck 30. Such a controller 49 preferably includes a voltage gauge 52, a frequency gauge 51, and a PTO switch 53. Corresponding tags 22, 23, 24 are respectively displayed on generator 20. Such gauges, 51, 52 and PTO switch 53 are mounted in a separate box (e.g., controller 49) in a remote location and are electrically connected to the generator 20. The purpose of such components is to monitor and evaluate the system's 10 performance when troubleshooting.

In operation, when the PTO switch 53 is turned on, it sends signals to the truck 30 platform (e.g., truck 30 and PTO 44) and, only if everything is ok, the truck 30 sends a reply signal back saying it is ok to engage a PTO 44 mode of the truck 30. The controller 49 interfaces with PTO 44 and truck 30 for engine and transmission signals. As long as operating parameters are acceptable, it sends signals to turn the truck 30 on thereby powering PTO 44. After the PTO 44 is engaged, the truck 30 looks for a resistance value to determine what equivalent speed to raise the engine to. The larger the resistance, the greater the engine RPM above truck 30 idle. When you turn the PTO switch 53 off, it removes the PTO 44 on signal, turns the PTO 44 off, and reduces engine RPM to regular truck 30 idle.

Advantages of the structural configuration of the present disclosure include, but are not limited to: 1) putting the generator 20 as a primary equipment versus the other equipment; 2) using higher kilowatts and lower CFM whereas conventional systems require higher CFM and lower limit kilowatts due to how the PTO drives the compressor; 3) targeting specific customer needs; and 4) using mechanical power through an on-board generator 20 to drive auxiliary equipment.

Referring to FIGS. 1-7 in general, a power-take-off (PTO 44) electrical generator system 10 for mechanically driving a rotary screw type air compressor 14 employed in a space-confined environment of a utility truck 30, is disclosed. Such a system 10 includes a controller 49 mounted to a portion of an existing utility truck 30, a PTO 44 operably coupled to an existing engine (e.g., transmission) of the existing utility truck 30 as well as the controller 49, an electrical generator 20 located at the existing utility truck 30 and operably coupled directly to and driven by the PTO 44, an air compressor 14 directly coupled to and mechanically driven directly by the electrical generator 20 and located at a space-confined section of the existing utility truck 30, and a cooling fan assembly 13 located at the existing utility truck 30 and directly coupled to the air compressor 14. Advantageously, the electrical generator 20 is intermediately positioned between the PTO 44 and the air compressor 14. Such a structural configuration provides the new, useful, and unexpected results of: 1) putting the generator 20 as a primary equipment versus the other equipment; 2) using higher kilowatts and lower CFM whereas conventional systems require higher CFM and lower limit kilowatts due to how the PTO drives the compressor; 3) targeting specific customer needs; and 4) using mechanical power through an on-board generator 20 to drive auxiliary equipment.

In a non-limiting exemplary embodiment, the air compressor 14 is an encapsulated rotary screw air compressor 14.

In a non-limiting exemplary embodiment, the electrical generator 20 has a centrally registered longitudinal axis 26 and includes: a first rectilinear input shaft 19 aligned along the centrally registered longitudinal axis 26, and a first coupling 16 directly mated to the first rectilinear input shaft 19.

In a non-limiting exemplary embodiment, the electrical generator 20 further includes a U-joint 17 directly connected to the first coupling 16.

In a non-limiting exemplary embodiment, the electrical generator 20 further includes a rectilinear power-drive shaft 18 (drive shaft) directly connected to the PTO 44 and the U-joint 17.

In a non-limiting exemplary embodiment, wherein the compressor 14 includes an input drive shaft 29. The electrical generator 20 further includes a second coupling 25 directly coupled to the first rectilinear input shaft 19 and the input drive shaft 29. Advantageously, the second coupling 25 is configured to rotate in sync with the first rectilinear input shaft 19 and the input drive shaft 29, and the rectilinear power-drive shaft 18. Advantageously, the second coupling 25 is coaxially aligned with the first rectilinear input shaft 19 and the input drive shaft 29, and the rectilinear power-drive shaft 18.

In a non-limiting exemplary embodiment, the cooling fan assembly 13 includes: a compressor 14 oil cooling input line 27 coupled to the encapsulated rotary screw air compressor 14 and the cooling fan assembly 13, and a compressor 14 oil cooling output line 28 coupled to the encapsulated rotary screw air compressor 14 and the cooling fan assembly 13.

Advantageously, the compressor 14 oil cooling output line 28 is located downstream from the compressor 14 oil cooling input line 27.

In a non-limiting exemplary embodiment, the controller 49 includes: a voltage gauge 52 in electrical communication with the generator 20, a frequency gauge 51 in electrical communication with the generator 20, and a PTO switch 53 in electrical communication with the PTO 44.

The present disclosure further includes a method of utilizing a power-take-off (PTO 44) electrical generator system 10 for mechanically driving a rotary screw type air compressor 14 employed in a space-confined environment of a utility truck 30. Such a method includes the steps of: providing an existing utility truck 30; providing and mounting a controller 49 to a portion of the existing utility truck 30; providing and operably coupling a PTO 44 to an existing engine (transmission) of the existing utility truck 30 as well as the controller 49; providing and locating an electrical generator 20 at the existing utility truck 30; operably coupling the electrical generator 20 directly to the PTO 44 such that the electrical generator 20 is driven by the PTO 44; providing and locating an air compressor 14 at a space-confined section of the existing utility truck 30; directly coupling the air compressor 14 to the electrical generator 20; the electrical generator 20 mechanically and directly driving the air compressor 14; providing and locating a cooling fan assembly 13 at the existing utility truck 30; and directly coupling 16 the cooling fan assembly 13 to the air compressor 14. Advantageously, the electrical generator 20 is intermediately positioned between the PTO 44 and the air compressor 14 14.

In a non-limiting exemplary embodiment, the system 10 may further include drive train that couples the engine assembly to a drive coupler and to the generator 20. Drive train may be any conventional mechanical drive apparatus suitable for use with engine. Preferably, the engine assembly provides an output shaft on which the generator 20 receives rotational power and by which the drive coupler is directly coupled. Such a drive coupler selectively couples the engine to the generator 20. For example, when the drive coupler includes a belt drive, and the generator 20 is arranged for the belt drive, a drive train may include a sheave directly coupled to the same shaft on which generator 20 receives power, a belt conveying rotational power from the engine to a sheave or fly wheel of the generator 20 and a conventional mechanism (e.g., an electrical solenoid or a pneumatic cylinder) that varies the tension in the belt to accomplish selective (e.g., on/off or proportional) coupling 16 16. In an alternate implementation, drive train may include any conventional clutch responsive to automatic control for selective coupling 16 16 to the generator 20.

In a non-limiting exemplary embodiment, mechanical power (e.g., rotational power) is converted to electrical power by the generator 20. The term generator 20 herein is used broadly to include any energy conversion machine including a DC generator 20 of the conventional types including active field coil and permanent magnet types. For example, the generator 20 may be a brushless type having rotor coils excited by a resonant circuit. The generator 20 includes a power winding (e.g., a multiphase, high current winding) and a control winding (e.g., a single phase, low current winding). When the engine directly drives the generator 20, the voltage across the control winding corresponds to engine RPM and reflects the combined mechanical loads presented by the generator 20, drive coupler, and air compressor 14 14. Power from the power winding is provided to loads of system 10 10 (unswitched, unregulated AC power), to a rectifier, and to a switching circuit. The control winding may be coupled to a controller 49 as discussed above.

Inside the transmission, the exact point along the gear train where the power is taken off determines whether the PTO 44 can be run independently of vehicle travel (ground speed). Preferably a live PTO 44 is employed, which allows control of the PTO 44 rotation independently of the tractor motion. This is an advantage when the load driven by the PTO 44 requires the tractor motion to slow or stop running to allow the PTO 44 driven equipment to catch up. It also allows operations where the tractor remains parked, such as an aerial lift or dump truck 30.

In a non-limiting exemplary embodiment, a split shaft PTO 44 is mounted to the truck 30's first rectilinear input shaft 18 to provide power to the PTO 44. Such a unit is an additional gearbox that separates the vehicle's first rectilinear input shaft 18 into two parts: the gearbox-facing shaft which will transmit the power of the engine to the split shaft PTO 44; and the axle-facing shaft which transmit the propelling power to the axle. The unit itself is designed to independently divert the engine's power to either the axle-facing shaft or the additional PTO 44 output shaft. This may be done by two independent clutches like tooth or dog clutches which can be operated at total driveline standstill, only. Since the main gearbox changes the rotation speed by selection of a gear, the PTO 44 cannot be operated during driving. The vehicle needs to be stationary for operation therefore. On 4×4 vehicles, only the rear first rectilinear input shaft 18 is used by the split shaft PTO 44 gearbox requiring the vehicles 4×4 drive scheme to be of the selectable 4WD type to keep the front axle first rectilinear input shaft 18 completely decoupled during PTO 44 operation. Such a methodology provides the new, useful, and unexpected results of: 1) putting the generator 20 as a primary equipment versus the other equipment; 2) using higher kilowatts and lower CFM whereas conventional systems require higher CFM and lower limit kilowatts due to how the PTO drives the compressor; 3) targeting specific customer needs; and 4) using mechanical power through an on-board generator 20 to drive auxiliary equipment.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. § 1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed as new and what is desired to secure by Letters Patent of the United States is:

1. A power-take-off (PTO) electrical generator system for mechanically driving a rotary screw air compressor employed in a space-confined environment of a utility truck, said system comprising:
    a controller mounted to a portion of an utility truck;
    a PTO operably coupled to an engine of the utility truck as well as said controller;
    an electrical generator located at the utility truck and operably coupled to and driven by said PTO;
    an air compressor coupled to and mechanically driven by said electrical generator and located at a space-confined section of the utility truck; and
    a cooling fan assembly located at the utility truck and coupled to said air compressor; wherein said compressor is an encapsulated screw air compressor.

2. The power-take-off (PTO) electrical generator system of claim 1, wherein said electrical generator has a centrally registered longitudinal axis and comprises:
    a first rectilinear input shaft aligned along the centrally registered longitudinal axis; and
    a first coupling directly mated to said first rectilinear input shaft.

3. The power-take-off (PTO) electrical generator system of claim 2, wherein said electrical generator further comprises: a U-joint directly connected to said first coupling.

4. The power-take-off (PTO) electrical generator system of claim 3, wherein said electrical generator further comprises: a rectilinear power-drive shaft directly connected to said PTO and said U-joint.

5. The power-take-off (PTO) electrical generator system of claim 4, wherein said compressor comprises: an input drive shaft; wherein said electrical generator further includes
    a second coupling directly coupled to said first rectilinear input shaft and said input drive shaft;
    wherein said second coupling is configured to rotate in sync with said first rectilinear input shaft and said input drive shaft and said rectilinear power-drive shaft;
    wherein said second coupling is coaxially aligned with said first rectilinear input shaft and said input drive shaft and said rectilinear power-drive shaft.

6. The power-take-off (PTO) electrical generator system of claim 5, wherein said cooling fan assembly comprises:
    a compressor oil cooling input line coupled to said encapsulated rotary screw air compressor and said cooling fan assembly; and
    a compressor oil cooling output line coupled to said encapsulated rotary screw air compressor and said cooling fan assembly;
    wherein said compressor oil cooling output line is located downstream from said compressor oil cooling input line.

7. The power-take-off (PTO) electrical generator system of claim 1, wherein said controller comprises:
    a voltage gauge in electrical communication with said generator;
    a frequency gauge in electrical communication with said generator; and
    a PTO switch in electrical communication with said PTO.

8. A power-take-off (PTO) electrical generator system for mechanically driving a rotary screw air compressor employed in a space-confined environment of a utility truck, said system comprising:
    a controller mounted to a portion of an utility truck;
    a PTO operably coupled to an engine of the utility truck as well as said controller;
    an electrical generator located at the utility truck and operably coupled directly to and driven by said PTO;
    an air compressor directly coupled to and mechanically driven directly by said electrical generator and located at a space-confined section of the utility truck; and
    a cooling fan assembly located at the utility truck and directly coupled to said air compressor;
    wherein said electrical generator is intermediately positioned between said PTO and said air compressor.

9. The power-take-off (PTO) electrical generator system of claim 8, wherein said air compressor is an encapsulated rotary screw air compressor.

10. The power-take-off (PTO) electrical generator system of claim 9, wherein said electrical generator has a centrally registered longitudinal axis and comprises:
    a first rectilinear input shaft aligned along the centrally registered longitudinal axis; and
    a first coupling directly mated to said first rectilinear input shaft.

11. The power-take-off (PTO) electrical generator system of claim 10, wherein said electrical generator further comprises: a U-joint directly connected to said first coupling.

12. The power-take-off (PTO) electrical generator system of claim 11, wherein said electrical generator further comprises: a rectilinear power-drive shaft directly connected to said PTO and said U-joint.

13. The power-take-off (PTO) electrical generator system of claim 12, wherein said compressor comprises: an input drive shaft; wherein said electrical generator further includes
    a second coupling directly coupled to said first rectilinear input shaft and said input drive shaft;
    wherein said second coupling is configured to rotate in sync with said first rectilinear input shaft and said input drive shaft and said rectilinear power-drive shaft;
    wherein said second coupling is coaxially aligned with said first rectilinear input shaft and said input drive shaft and said rectilinear power-drive shaft.

14. The power-take-off (PTO) electrical generator system of claim 13, wherein said cooling fan assembly comprises:
    a compressor oil cooling input line coupled to said encapsulated rotary screw air compressor and said cooling fan assembly; and
    a compressor oil cooling output line coupled to said encapsulated rotary screw air compressor and said cooling fan assembly;
    wherein said compressor oil cooling output line is located downstream from said compressor oil cooling input line.

15. The power-take-off (PTO) electrical generator system of claim 8, wherein said controller comprises:
    a voltage gauge in electrical communication with said generator;
    a frequency gauge in electrical communication with said generator; and
    a PTO switch in electrical communication with said PTO.

16. A method of utilizing a power-take-off (PTO) electrical generator system for mechanically driving a rotary screw air compressor employed in a space-confined environment of a utility truck, said method comprising the steps of:
- providing an utility truck;
- providing and mounting a controller to a portion of the utility truck;
- providing and operably coupling a PTO to an engine of the utility truck as well as said controller;
- providing and locating an electrical generator at the utility truck;
- operably coupling said electrical generator directly to said PTO such that said electrical generator is driven by said PTO;
- providing and locating an air compressor at a space-confined section of the utility truck;
- directly coupling said air compressor to said electrical generator;
- said electrical generator mechanically and directly driving said air compressor;
- providing and locating a cooling fan assembly at the utility truck;
- directly coupling said cooling fan assembly to said air compressor; and
- wherein said electrical generator is intermediately positioned between said PTO and said air compressor.

* * * * *